(12) United States Patent
Chatterjee et al.

(10) Patent No.: US 11,455,558 B2
(45) Date of Patent: Sep. 27, 2022

(54) METHOD AND SYSTEM FOR MANAGING EVENTS USING AUTOMATED RULE GENERATION

(71) Applicant: Tata Consultancy Services Limited, Mumbai (IN)

(72) Inventors: Swarup Chatterjee, Kolkata (IN); Sharmila Baksi, Kolkata (IN); Tanmaya Tewari, Kolkata (IN); Deb Shankar Dey, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 415 days.

(21) Appl. No.: 16/740,120

(22) Filed: Jan. 10, 2020

(65) Prior Publication Data
US 2020/0226484 A1     Jul. 16, 2020

(30) Foreign Application Priority Data

Jan. 10, 2019   (IN) .............................. 201921001228

(51) Int. Cl.
  *G06F 15/16*   (2006.01)
  *G06N 5/04*    (2006.01)
  *G06Q 10/00*   (2012.01)
  *H04L 41/06*   (2022.01)

(52) U.S. Cl.
  CPC ............. *G06N 5/046* (2013.01); *G06Q 10/20* (2013.01); *H04L 41/06* (2013.01)

(58) Field of Classification Search
  None
  See application file for complete search history.

(56) References Cited

U.S. PATENT DOCUMENTS

| | | | |
|---|---|---|---|
| 7,930,256 B2 | 4/2011 | Gonsalves et al. | |
| 2010/0097213 A1* | 4/2010 | Bajpay | G08B 25/08 340/540 |
| 2012/0260306 A1* | 10/2012 | Njemanze | G06Q 10/06 726/1 |
| 2016/0164893 A1 | 6/2016 | Levi | |

* cited by examiner

*Primary Examiner* — Wing F Chan
*Assistant Examiner* — Andrew Woo
(74) *Attorney, Agent, or Firm* — Finnegan, Henderson, Farabow, Garrett & Dunner, LLP

(57) ABSTRACT

In the monitoring domain, event management can deal with the monitoring of behavioural changes for any type of entity. Normally, the event management requires a lot of human intervention to generate a set of rules which results in adding effort and cost. A method and system for managing a plurality of events using automated rule generation has been provided. The system automatically generates a set of rules by studying the trend of incoming events over a period of time by computing moving percentile, thereby removing the need of human intervention to define rules for alert generation. The reported alerts are more specific and accurate, since the trend of incoming data is used to define the rules for alert generation. Further the method also provides the provision for the resolving the generated alerts either manually or automatically.

11 Claims, 4 Drawing Sheets

METHOD AND SYSTEM FOR MANAGING EVENTS USING AUTOMATED RULE GENERATION

CROSS-REFERENCE TO RELATED APPLICATIONS

This U.S. patent application claims priority under 35 U.S.C. § 119 to: India Application No. 201921001228, filed on Jan. 10, 2019. The entire contents of the aforementioned application are incorporated herein by reference.

FIELD OF THE INVENTION

The embodiments herein generally relates to the field of event management. More particularly, but not specifically, the invention provides a method and system for managing a plurality of events using automated rule generation.

BACKGROUND OF THE INVENTION

With the progress of e-commerce in almost all of the businesses have resulted in the increased usage of computing devices and various resources. The computing devices is increasingly dominated by network and systems management. Various tasks such as establishing configurations, help desk support, distributing software, and ensuring the availability and performance of vital services are managed by these computing devices.

The important step in managing availability and performance of the computing devices is event management. Almost all computing devices have a capability whereby the onset of an exceptional condition results in the generation of a message so that potential problems are detected before they lead to widespread service degradation. Regular behaviour of an entity is referred as an "event", while an exceptional conditions are referred to as "alert."

Event management is the process of studying the changes in behaviour (referred to as event) of a resource (which might be a hardware or a software entity), analyzing those events, and generating alerts/notifications to the end user for any probable issues being identified. Here, analyzing the real-time events is usually done across a set of rules (defining a threshold). These rules are defined by the end-user, and also the generated alerts to be acted upon by the support person manually. Thus, the degree of accuracy in the defined rule leads to generation of more accurate alerts. This degree of accuracy will be determined by the experience & knowledge of the person, who defines the rules. Also, each generated alert requires human intervention to act on the same, thereby adding to cost & effort.

High quality event management has long been seen as the most important demand of a healthy business. Various methods and tools have been used in the prior art for the event management through automated rule generation. Most of these tools work only on a limited time period window for analysing the event to auto-generate the rules and are not dynamic in nature. This results in generation of false alerts or improper alerts.

SUMMARY

Embodiments of the present disclosure present technological improvements as solutions to one or more of the above-mentioned technical problems recognized by the inventors in conventional systems. For example, in one embodiment, a system for managing a plurality of events have been provided. The system comprises an input module, a memory and a processor in communication with the memory. The input module collects events information as an input from a plurality of resources, wherein the events information are collected in real-time. The processor further comprises a conversion module, an event checking module, an event analyzer, a rule generation module, an event patter classifier, an alert generator and an alert resolver. The conversion module converts all the collected events information into a homogenous format. The event checking module checks whether the collected event information is corresponding to a genuine event activity. The event analyzer analyzes the homogenous collected events information for a predefined time period. The rule generation module generates a set of rules based on the analysis, wherein the generated set of rules are stored in a rule database. The event pattern classifier evaluates the events information across the set of rules. The alert generator generates an alert corresponding to the event, if the event violates the set of rules based on the evaluation of the events, wherein the alert is stored in an alert database, wherein the alert converted into notifications if a set of criteria is satisfied. The alert resolver resolves the alert using a manual or an automatic process.

In another aspect the embodiment here provides a method for managing a plurality of events. Initially, events information is collected as an input from a plurality of resources, wherein the events information are collected in real-time. All the collected events information are then converted into a homogenous format. In the next step, it is checked whether the collected event information is corresponding to a genuine event activity. Further, the homogenous collected events information is analysed for a predefined period of time. In the next step, a set of rules are generated based on the analysis, wherein the generated set of rules are stored in a rule database. In the next step, the events information is evaluated across the set of rules. Further an alert is generated corresponding to the event, if the event violates the set of rules based on the evaluation of the events, wherein the alert is stored in an alert database, wherein the alert converted into notifications if a set of criteria is satisfied. And finally the alert is resolved using a manual or an automatic process.

In another aspect the embodiment here provides one or more non-transitory machine readable information storage mediums comprising one or more instructions which when executed by one or more hardware processors cause managing a plurality of events. Initially, events information is collected as an input from a plurality of resources, wherein the events information are collected in real-time. All the collected events information are then converted into a homogenous format. In the next step, it is checked whether the collected event information is corresponding to a genuine event activity. Further, the homogenous collected events information is analysed for a predefined period of time. In the next step, a set of rules are generated based on the analysis, wherein the generated set of rules are stored in a rule database. In the next step, the events information is evaluated across the set of rules. Further an alert is generated corresponding to the event, if the event violates the set of rules based on the evaluation of the events, wherein the alert is stored in an alert database, wherein the alert converted into notifications if a set of criteria is satisfied. And finally the alert is resolved using a manual or an automatic process.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
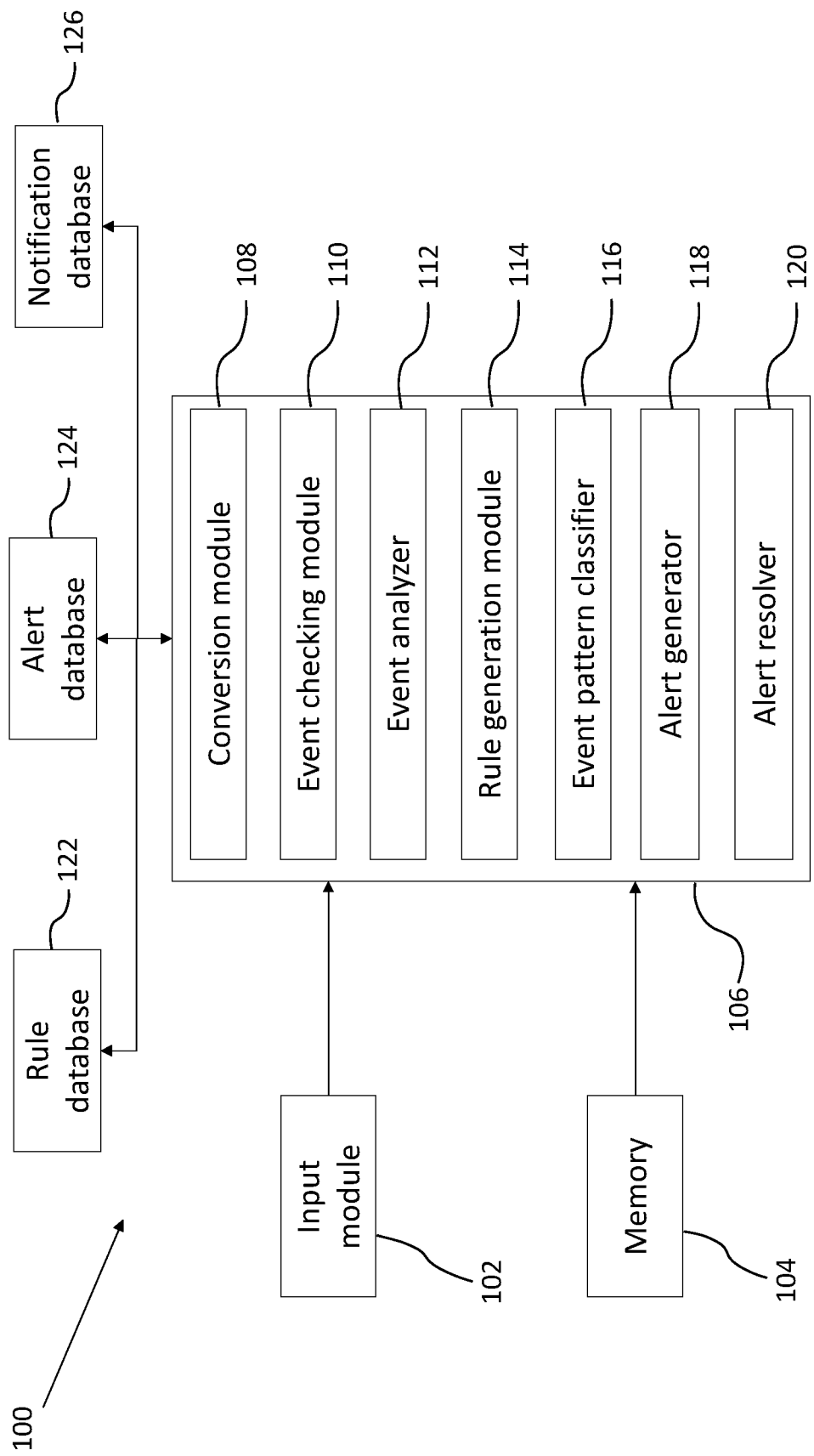
FIG. 1 illustrates a block diagram of a system for managing a plurality of events using automated rule generation according to an embodiment of the present disclosure.
Figure 2:
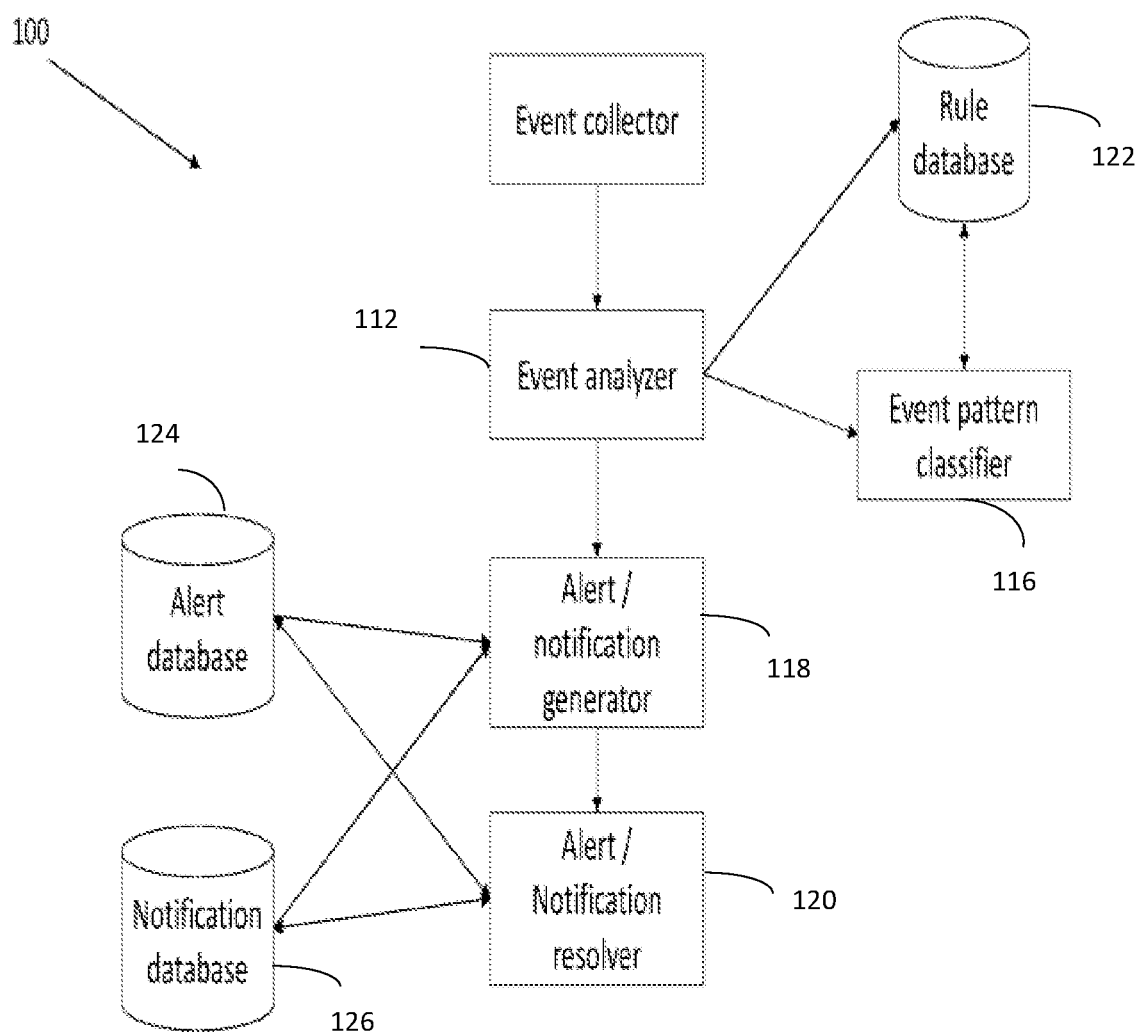
FIG. 2 shows an architectural diagram of the system for managing a plurality of events using automated rule generation according to an embodiment of the disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

According to an embodiment of the disclosure, a system 100 for managing a plurality of events using automated rule generation is shown in the block diagram of FIG. 1. The system 100 uses an approach to auto-generate the rules by studying the trend of incoming events over a period of time (moving percentile computation), thereby removing the need of human intervention to define rules for alert generation. The system 100 can be used in various environment where lot of computing devices and other devices are being used. The system 100 can be used in information technology (IT), sensors devices, energy devices, distributed environment etc.

According to an embodiment of the disclosure, the system 100 further comprises an input module 102, a memory 104 and a processor 106 as shown in the block diagram of FIG. 1. The processor 106 works in communication with the memory 104. The processor 106 further comprises a plurality of modules. The plurality of modules accesses the set of algorithms stored in the memory 104 to perform certain functions. The processor 106 further comprises a conversion module 108, an event checking module 110, an event analyzer 112, a rule generation module 114, an event pattern classifier 116, an alert generator 118 and an alert resolver 120 as shown in FIG. 1 and architectural setup of FIG. 2.

According to an embodiment of the disclosure the input module 102 is configured to collect a plurality of events information as an input from a plurality of resources. The plurality of resources may be hardware resources or software resources. The input module 102 collects the events from various types of resources on a real-time basis The input module 102 and the user interface 104 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite.

According to an embodiment of the disclosure, the processor 106 further comprises the conversion module 108. The conversion module 108 is configured to convert all the collected events information into a homogenous format. The homogenous format is sensible to the system 100. Since the information is collected from the plurality of resources, which are of different types. The plurality of resources provide event information in different units such as percentage, log value, metric quantity etc. Thus, the heterogeneous types of events information is converted into the homogeneous format. In an example, the homogenous format may be provided in the form of percentile.

According to an embodiment of the disclosure, the processor 106 further comprises the event checking module 110. The event checking module 110 is configured to check whether the collected event information is corresponding to a genuine event activity. The event checking module 110 initially checks if the event is from a resource which is directly/indirectly under a defined planned maintenance activity. A resource is said to be under direct planned maintenance, if the configuration item corresponding to the resource is a part of the definition of the planned maintenance rule. For any resource which is dependent on the resource under direct maintenance, the dependent resource is said to be under indirect planned maintenance activity. For example, if a database server is under maintenance from 4:00 PM to 05:00 PM on 9 Dec. 2017, then all the application servers which use the database server will be under indirect planned maintenance activity for the mentioned time period. So, events from the application servers will also need to be suppressed during the said period.

According to an embodiment of the disclosure, the processor 106 further comprises the event analyzer 112 and the rule generation module 114. The event analyzer 112 is configured to analyze the homogenous collected events information for a predefined time period. The rule generation module 114 is configured to generate a set of rules based on the analysis of the event analyzer 112. The generated set of rules are stored in a rule database 122. It should be appreciated that the step of analyzing is performed through moving percentile computation of the events information over the predefined period of time.

For the analysis of the collected data, the event analyzer 112 uses the machine learning techniques. Through machine learning, the system 100 studies the behavioral trend of the collected data over the predefined time period, and uses this knowledge to raise alerts/notifications to the user, thereby detecting the potential issues. For example, if the system 100 studies the CPU utilization data of a server over a 7-day period and finds that the utilization is more than 80% during the business hours (9 AM-5 PM), then the system 100 generates alerts for the CPU utilization data going above 80% only during the non-business hours. In this case alerts generated are accurate and will depend entirely on the behavioral trend of the incoming data. The trend-analysis can be computed through moving percentile computation of the data over a period of time. The frequency of computation (monthly/weekly/daily/hourly) can be set as per the user preference. The computed value will modify periodically and thus the alert generation will be entirely dynamic.

In another embodiment of the disclosure, the user may also define the set of rules manually with the threshold conditions, so that alerts/notifications are generated, as and when the defined threshold condition is violated. The set of rules are defined in this case are entirely based on the human knowledge and experience.

According to an embodiment of the disclosure, the processor 106 also comprises the event pattern classifier 116. The event pattern classifier 116 is configured to evaluate the events information across the set of rules. At the same time, the event pattern classifier 116 is also configured to responsible to revise the rule set present in the rule database as per the latest set of events and update is again the rule database 122. The event pattern classifier 116 is responsible for the trend analysis of the events over a period of time and the subsequent updation of the rule database 122 with the revised automated rule set.

According to an embodiment of the disclosure, the processor 106 further comprises the alert generator 118. The alert generator 118 is configured to generate an alert corresponding to the event, if the event violates the set of rules based on the evaluation of the event pattern classifier 118. The alert satisfying a set of criteria get converted to notifications. The notifications are generated in the form of an email or an SMS. Though it should be appreciated that the notification can also be generated in any other form. The generated alerts are stored in an alert database 124. The alert generator 118 is also configured to check if the event is to have a first time alert generated or the event has already an alert associated with it & that the alert is to be updated in the alert database 124. Similarly, the generated notification can also be sent for the analyzing and updating a notification database 126 based on the analysis.

In an embodiment of the disclosure, the alerts are generated automatically in the form of tickets if a predefined set of rules are satisfied. The tickets are a form the alerts which can be attended by the user.

According to an embodiment of the disclosure, the processor 106 also comprises the alert resolver 120. The alert resolver 120 is configured to resolve the alert using a manual or an automatic process. For example, for an alert generated for disk utilization of more than 90%, the action can be to purge the application server logs older than 48 hours. So, based on the defined action (during rule creation), the action can be executed. Similarly, if the user wants to manually act on an alert, the same can also be done.

According to an embodiment of the disclosure, all the alerts will have an associated priority & severity which decides the criticality of the alert. This will determine the time duration or service level agreement (SLA) for alerts. The system will have the capability to upgrade the criticality of an alert when left unattended beyond a certain timeperiod. This will ensure that an alert generated will be obviously attended.

According to an embodiment of the disclosure, the system 100 can also be integrated with an external incident management tool. In this case the alerts can be logged in the external incident management tool in the form of incidents. The incidents can be created automatically or manually.

According to an embodiment of the disclosure, the system 100 can also be provided with a plug-in feature of external computational modules. The moving-average computation/trend analysis of the event data can be carried out by an external module. The external module will only feed the results to the system, and the system will act on the same by generating alerts/notifications. In this way, the system will be highly modularized. For example, the user defines a rule of the format: "Raise an alert when the CPU utilization goes above 90th percentile of last 1 month's values". In this case, the actual computation of the 90th percentile of values noted in last 1 month will be owned by the external module. The module will simply feed the result to the central system. The system will compare the current value with the fed result and raise/not raise an alert for the same.

Figure 3A:
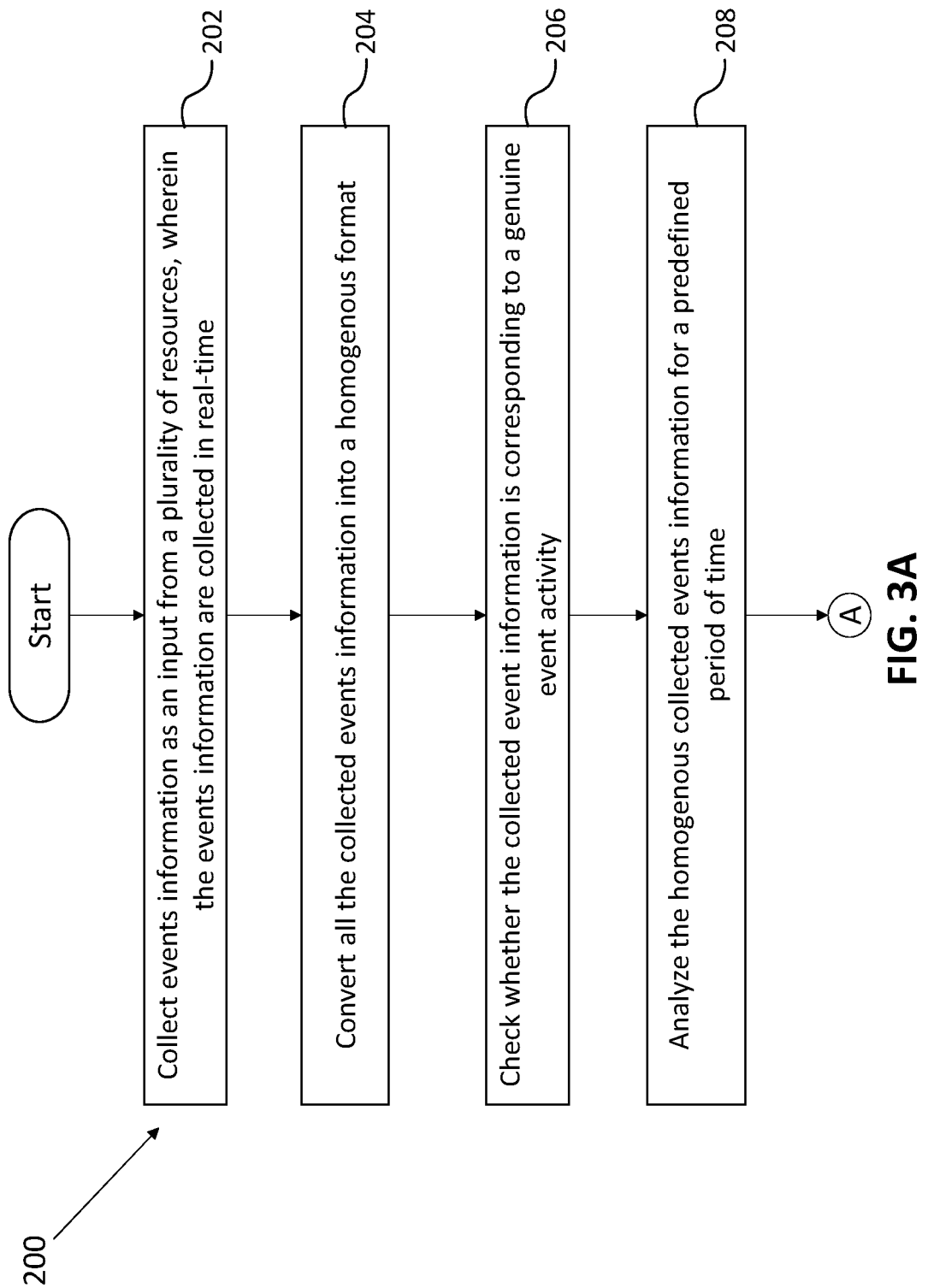
FIG. 3A-3B is a flowchart illustrating the steps involved in managing a plurality of events using automated rule generation according to an embodiment of the present disclosure.
Figure 3B:
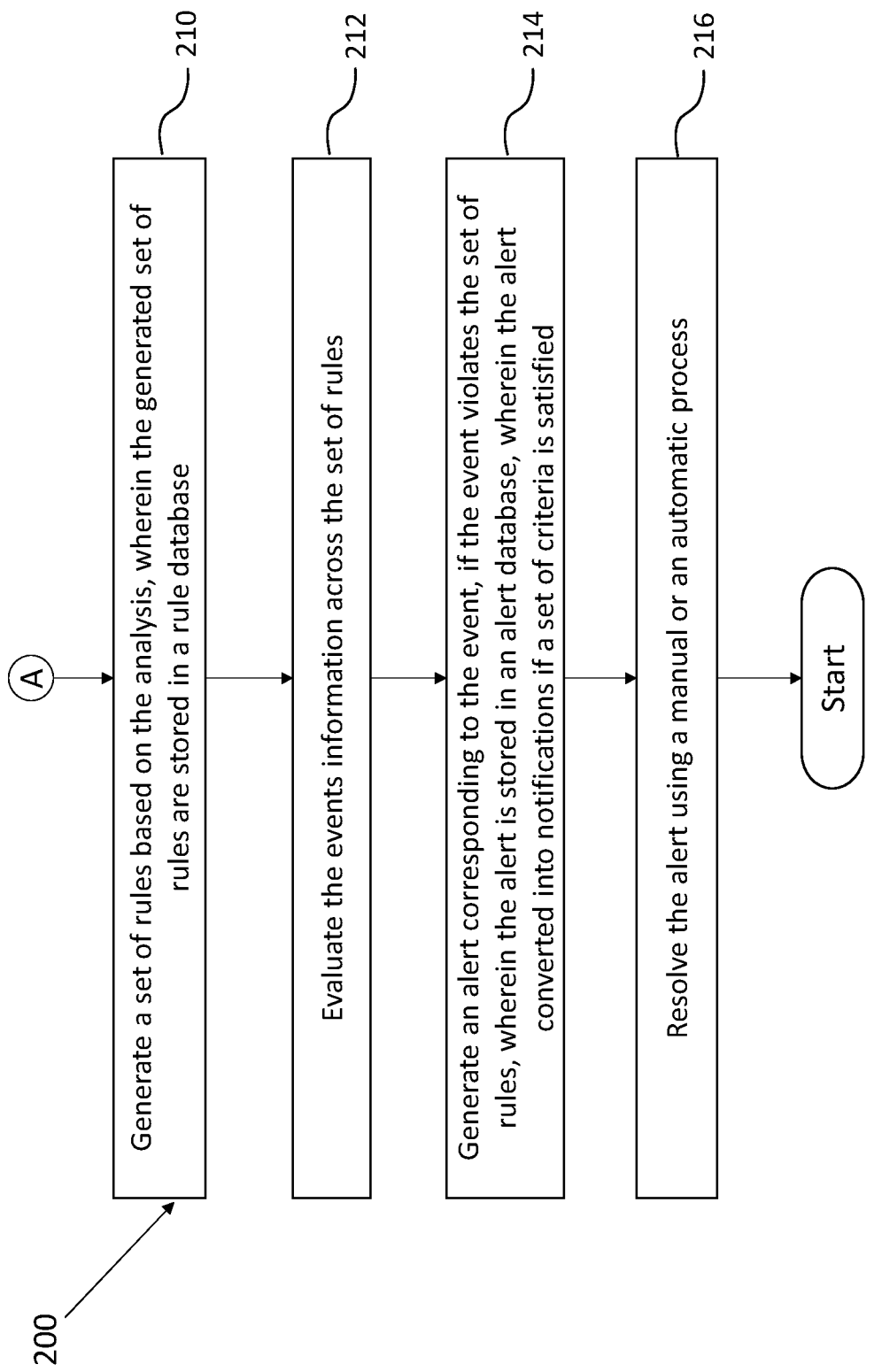

In operation, a flowchart 200 illustrating a method for managing the plurality of events is shown in FIG. 3A-3B. Initially, at step 202, the events information are collected as an input from the plurality of resources, wherein the events information are collected in real-time. The plurality of resources may be hardware or software. In the next step 204, all the collected events information is converted into a homogenous format. At step 206, the collected event information is checked whiter it is corresponding to a genuine event activity. The genuine activity events are the events which falls outside the window of a pre-planned maintenance activity. Planned maintenance window is the time period during which a maintenance activity is planned for the resource. Thus, any monitored data from the resource, needs to be ignored during this window period. The system will allow for the registration of such outage periods and will suppress any incoming data from the resources under maintenance during those periods. This will prevent any unnecessary/irrelevant alerts on the monitoring alert dashboard.

In the next step 208, the homogenous collected events information is analyzed for the predefined period of time. At step 210, the set of rules are generated based on the analysis performed in the previous step. The analysis is performed using various machine learning techniques. The generated set of rules are stored in the rule database 122. In the next step 212, the events information is evaluated across the generated set of rules.

In the next step 214, the alert is generated corresponding to the event, if the event violates the set of rules based on the evaluation of the events, wherein the alert converted into notifications if the set of criteria is satisfied. The alert is stored in an alert database. In an example, the notifications are generated in the form of email or SMS to the user. And finally at step 216, the alerts are resolved using a manual or an automatic process.

According to an embodiment of the disclosure, the system 100 can also be explained with the help an example as follows. For example and event E1 is collected by the input module and converted in to the homogenous format. For the event E1 received in the event analyzer, it will initially check if the event is from a resource (or entity) which is directly/indirectly under a defined planned maintenance activity. For any resource which is dependent on the resource under direct maintenance, the dependent resource is said to be under indirect planned maintenance activity. If the event E1 is not to be suppressed, then the component will fetch the rule set from the rule database. Next, the event value is evaluated across the rule set. Based on the outcome of evaluation, i.e. if the rule set is violated, the event will be eligible for alert generation and thus will be forwarded for alert generation.

The event E1 will also be forwarded to the event pattern classifier, once the event analyzer is done with its evaluation. When the event enters into the event analyzer, the moving percentile of the set of historical events based on the user-defined frequency is computed/revised. If the event E1 enters into the system and the user had defined the frequency of moving percentile computation as 7-day average for E1 type of events. Then, the component revised the 7-day average and updates the rule DB with the revised rule (event value>θ, where θ is the revised 7-day average).

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for managing a plurality of events, the method comprising:
    collecting event information of the plurality of events as an input from a plurality of resources, wherein
        the event information is collected in real-time,
        the event information of the plurality of events is collected in a first period of time,
        the collected event information is in a heterogeneous format, and
        the heterogeneous format comprises a percentage format, a log value format, and a metric quantity format;
    converting the collected event information into a homogeneous format, wherein the homogeneous format is a percentile format;
    checking whether the collected event information is corresponding to a genuine event activity
    analyzing the homogeneous collected event information for a predefined period of time, wherein
        the analysis is performed through moving percentile computation of the event information over the predefined period of time, and
        the moving percentile computation is performed using machine learning techniques;
    generating a set of rules based on the analysis, wherein the generated set of rules are stored in a rule database;
    evaluating the homogeneous collected event information across the generated set of rules;
    generating an alert to a corresponding event of the plurality of events, when the corresponding event violates the generated set of rules based on the evaluation of the plurality of events, wherein the generated alert is stored in an alert database, wherein the generated alert is converted into notifications, if a set of criteria is satisfied, and wherein the generated alert has a priority, and the priority indicates a criticality of the generated alert;
    upgrading the criticality of the generated alert, when the generated alert is left unattended beyond a scheduled time-period;
    resolving the generated alert using a manual or an automatic process;
    revising the stored set of rules in the rule database, based on specific event information of a plurality of specific events, wherein
        the specific event information of the plurality of specific events is collected in a second period of time,
        the second period of time is later than the first period of time, and
        the event information is different from the specific event information; and
    updating the rule database based on the revision of the stored set of rules.

2. The method of claim 1, further comprising of sending the converted notifications for analyzing and updating a notification database.

3. The method of claim 1, wherein the converted notifications are generated in a form of an email or an SMS.

4. The method of claim 1, wherein the generated alert is automatically converted in a form of tickets, if a predefined set of rules are satisfied.

5. The method of claim 1, wherein
    the genuine event activity is an event of the plurality of events which falls outside a preplanned maintenance activity of a resource of the plurality of resources,
    a preplanned maintenance activity includes a planned maintenance time window, and
    the planned maintenance window is a time period during which a maintenance activity is planned for each of the resource and a dependent resource which dependent on the resource.

6. The method of claim 1, further comprising deciding the criticality of the generated alert depending on an associated severity.

7. The method of claim 1, wherein the plurality of resources include hardware or software entities.

8. The method of claim 1, further comprising storing the converted notifications in a notification database.

9. The method of claim 1, further comprising integrating an external incident management tool to log incidents.

10. A system for managing a plurality of events, the system comprising:
    an input module for collecting event information of the plurality of events as an input from a plurality of resources, wherein
        the event information is collected in real-time, the event information of the plurality of events is collected in a first period of time,
the collected event information is in a heterogeneous format, and
the heterogeneous format comprises a percentage format, a log value format, and a metric quantity format;
a memory; and
a processor in communication with the memory, the processor further comprising:
a conversion module for converting the collected event information into a homogeneous format, wherein the homogeneous format is a percentile format;
an event checking module for checking whether the collected event information is corresponding to a genuine event activity;
an event analyzer for analyzing the homogeneous collected event event information for a predefined time period, wherein
the analysis is performed through moving percentile computation of the event information over the predefined period of time, and
the moving percentile computation is performed using machine learning techniques;
a rule generation module generating a set of rules based on the analysis, wherein the generated set of rules are stored in a rule database;
an event pattern classifier for evaluating the homogeneous collected event information across the generated set of rules,
an alert generator for generate an alert corresponding to a corresponding event, when the corresponding event violates the generated set of rules based on the evaluation of the plurality of events, wherein the generated alert is stored in an alert database, wherein the generated alert is converted into notifications, if a set of criteria is satisfied, wherein the generated alert has a priority, and the priority indicates a criticality of the generated alert;
an alert resolver for:
upgrading the criticality of the generated alert, when the generated alert left unattended beyond a scheduled time-period;
resolving the generated alert using a manual or an automatic process, wherein the event pattern classifier is further for:
revising the stored set of rules in the rule database, based on specific event information of a plurality of specific events, wherein
the specific event information of the plurality of specific events is collected in a second period of time,
the second period of time is later than the first period of time, and
the event information is different from the specific event information; and
updating the rule database based on the revision of the stored set of rules.

11. One or more non-transitory machine readable information storage mediums comprising one or more instructions which when executed by one or more hardware processors cause managing a plurality of events, the instructions cause:
collecting event information of the plurality of events as an input from a plurality of resources, wherein
the event information is collected in real-time,
the event information of the plurality of events is collected in a first period of time,
the collected event information is in a heterogeneous format, and
the heterogeneous format comprises a percentage format, a log value format, and a metric quantity format;
converting the collected event information into a homogeneous format, wherein the homogeneous format is a percentile format;
checking whether the collected event information is corresponding to a genuine event activity;
analyzing the homogeneous collected event information for a predefined period of time, wherein
the analysis is performed through moving percentile computation of the event information over the predefined period of time, and
the moving percentile computation is performed using machine learning techniques;
generating a set of rules based on the analysis, wherein the generated set of rules are stored in a rule database;
evaluating the homogeneous collected event information across the generated set of rules;
generating an alert to a corresponding event of the plurality events, when the corresponding event violates the generated set of rules based on the evaluation of the plurality of events, wherein the generated alert is stored in an alert database, wherein the generated alert is converted into notifications, if a set of criteria is satisfied, wherein the generated alert has a priority, and the priority indicates a criticality of the generated alert;
upgrading the criticality of the generated alert, when the generated alert left unattended beyond a scheduled time-period;
resolving the generated alert using a manual or an automatic process;
revising the stored set of rules in the rule database, based on specific event information of a plurality of specific events, wherein
the specific event information of the plurality of specific events is collected in a second period of time,
the second period of time is later than the first period of time, and
the event information is different from the specific event information; and
updating the rule database based on the revision of the stored set of rules.

\* \* \* \* \*